(12) United States Patent
Pensak et al.

(10) Patent No.: US 8,225,290 B2
(45) Date of Patent: *Jul. 17, 2012

(54) SYSTEMS AND METHODS FOR REGULATING EXECUTION OF COMPUTER SOFTWARE

(75) Inventors: David A. Pensak, Wilmington, DE (US); Douglas C. Merrell, San Jose, CA (US)

(73) Assignee: V. i. Laboratories, Inc., Waltham, MA (US)

( * ) Notice: Subject to any disclaimer, the term of this patent is extended or adjusted under 35 U.S.C. 154(b) by 1054 days.

This patent is subject to a terminal disclaimer.

(21) Appl. No.: 12/104,589

(22) Filed: Apr. 17, 2008

(65) Prior Publication Data

US 2009/0328003 A1  Dec. 31, 2009

Related U.S. Application Data

(63) Continuation-in-part of application No. 10/774,368, filed on Feb. 10, 2004, now Pat. No. 7,370,319.

(51) Int. Cl.
*G06F 9/44* (2006.01)
(52) U.S. Cl. ........ 717/124; 717/126; 717/127; 717/129; 717/139; 713/189; 712/227; 712/244
(58) Field of Classification Search .................. None
See application file for complete search history.

(56) References Cited

U.S. PATENT DOCUMENTS

| | | | | |
|---|---|---|---|---|
| 5,418,942 A | * | 5/1995 | Krawchuk et al. ................ | 1/1 |
| 5,754,845 A | * | 5/1998 | White .......................... | 717/147 |
| 5,784,552 A | * | 7/1998 | Bishop et al. ............. | 714/38.12 |
| 5,923,885 A | * | 7/1999 | Johnson et al. ............... | 717/176 |
| 5,940,590 A | | 8/1999 | Lynne et al. | |
| 5,960,437 A | * | 9/1999 | Krawchuk et al. ............ | 707/702 |
| 5,978,902 A | | 11/1999 | Mann | |
| 5,983,272 A | * | 11/1999 | Rosen et al. ................... | 709/227 |
| 6,009,543 A | | 12/1999 | Shavit | |
| 6,031,990 A | * | 2/2000 | Sivakumar et al. ............ | 717/124 |
| 6,071,317 A | * | 6/2000 | Nagel ............................ | 717/128 |
| 6,126,328 A | * | 10/2000 | Mallory et al. ................ | 717/114 |
| 6,141,010 A | * | 10/2000 | Hoyle ............................ | 715/854 |

(Continued)

OTHER PUBLICATIONS

Title: A generic attac on checksumming-based software tamper resistence, author: Wurster, G et al, source: IEEE, dated: May 8, 2005.*

(Continued)

*Primary Examiner* — Chameli Das
(74) *Attorney, Agent, or Firm* — Brian M. Dingman; Mirick, O'Connell, Demallie, + Lougee, LLP

(57) ABSTRACT

A method for regulating execution of an application program includes a process for preparing the application and a process for executing the application. The preparation process divides the application program into related segments and encrypts instructions of at least one segment, positions encrypted instructions in at least two discontiguous regions within an executable file, and associates header information with at least one discontiguous region. The execution process initiates execution of the protected application when at least a portion of the application instructions are available to the computer only in encrypted form. Also provided are systems and methods to allow debugging of code extensions to protected applications without sacrificing protection of the application. A Secure Debugger allows extension developers to examine memory and set breakpoints in their own extensions, without permitting them to view information in the rest of the protected application.

20 Claims, 6 Drawing Sheets

U.S. PATENT DOCUMENTS

| | | | |
|---|---|---|---|
| 6,219,829 B1* | 4/2001 | Sivakumar et al. | 717/131 |
| 6,701,439 B1* | 3/2004 | Dunn | 380/255 |
| 6,742,177 B1 | 5/2004 | Dorak, Jr. et al. | |
| 6,779,176 B1* | 8/2004 | Chambers et al. | 717/169 |
| 7,149,900 B2* | 12/2006 | Rothrock | 713/189 |
| 7,421,689 B2* | 9/2008 | Ross et al. | 718/1 |
| 2003/0140241 A1 | 7/2003 | England et al. | |
| 2003/0221116 A1* | 11/2003 | Futoransky et al. | 713/189 |
| 2004/0015958 A1 | 1/2004 | Veil et al. | |
| 2004/0054901 A1 | 3/2004 | England et al. | |
| 2004/0064668 A1* | 4/2004 | Kjos et al. | 711/202 |
| 2005/0091652 A1* | 4/2005 | Ross et al. | 718/1 |
| 2005/0166069 A1 | 7/2005 | Hashimoto et al. | |
| 2005/0204348 A1* | 9/2005 | Horning et al. | 717/140 |
| 2006/0248353 A1 | 11/2006 | Shear et al. | |

OTHER PUBLICATIONS

Title: Tamper resistance mecanisms for secure embedded systems, author: Ravi, S et al, source: IEEE, dated: Aug. 24, 2004.*

Microsoft Computer Dictionary, Fifth Edition, 2002, p. 148.

Wang, Chenxi, et al.; "Software Tamper Resistance: Obstructing Static Analysis of Programs" ; p. 1-18, 2000; retrieved from scholar.google.com Jul. 20, 2008.

Ogiso, Toshio, et al.; "Software Tamper Resistance Based on the Difficulty of Interprocedural Analysis"; 2002; retrieved from scholar.google.com Jul. 20, 2008.

Aucsmith, David; "Tamper Resistant Software: An Implementation"; Lecture Notes in Computer Science 1174, p. 317-333, May/Jun. 1996 Proceedings.

European Patent Office Supplementary European Search Report for co-pending European Patent Application No. 04710200.9 , dated Oct. 5, 2010 (4 pages).

Lie, David, et al., "Architectural Support for Copy and Tamper Resistant Software," ASPLOS. Proceedings. Intl Conf. on Architectural Support for Programming Languages and Operating Systems, vol. 34, No. 5, Nov. 12, 2000, pp. 168-177.

Cohen, Frederick B., "Operating sytem protection through program evoloution," Computers & Security, Elsevier Science Publishers, Amsterdam, NL vol. 12, No. 6, Oct. 1, 1993, pp. 565-584.

Torrubia, Andres, et al., "Information Security in Multiprocessor Systems Based on the X86 Architecture," Computers & Security, Elsevier Science Publishers, Amsterdam, NL, vol. 19, No. 6, Oct. 1, 2000, pp. 559-563.

Aucsmith, David, "Tamper Resistant Software: An Implementation," Information Hiding, International Workshop Proceedings, Jan. 1, 1996, pp. 317-333.

* cited by examiner

SYSTEMS AND METHODS FOR REGULATING EXECUTION OF COMPUTER SOFTWARE

CROSS REFERENCE TO RELATED APPLICATION

This application is a continuation-in-part of, and claims priority from, U.S. patent application Ser. No. 10/774,368 entitled "System and Method for Regulating Execution of Computer Software," filed Feb. 10, 2004 to David A. Pensak and Douglas C. Merrell, the entire content of which is incorporated by reference herein, and which is based on and claims the benefit of priority of U.S. Provisional Patent Application Ser. No. 60/446,260 filed on Feb. 11, 2003, the disclosure of which is expressly incorporated by reference herein in its entirety.

FIELD OF THE INVENTION

This invention relates to systems and methods for regulating execution of computer software, and to computer programs having programming structures related to such regulation.

BACKGROUND OF THE INVENTION

As software vendors, corporate entities, and government agencies increasingly market and deploy their applications around the glob0e, securing the sensitive intellectual property resident in these applications becomes critical. Organizations need to ensure that software programs are executed the way they are intended and keep the intellectual property resident within them safe from piracy, theft, and tampering, regardless of where these applications are located. While security solutions exist to protect the way computers process and store sensitive and classified data, they may not be designed to protect the actual operation of application code and algorithms within computing environments. As a result, critical assets such as nuclear power plants, communication systems, voting systems, defense systems, power grids, air traffic control systems, medical equipment, and financial systems may not be adequately protected. Moreover, the hacker and pirating communities continue to hone their reverse engineering skills and develop tools such as disassemblers, code tracers, rootkits, and software debugging products to determine how a piece of software works. These techniques have made software piracy, tampering, and intellectual property theft increasingly serious problems.

Traditional software security technologies can be grouped into three categories: host-based, software vulnerability scanning, and copy protection. Host-based solutions treat an application as a "black box" and attempt to safeguard the host environment by analyzing network traffic and application transactions, or by detecting malicious behavior on the host operating system. Software vulnerability scanning solutions analyze application source code to discover vulnerabilities that have been introduced during the development process. These tools are valuable for mitigating security vulnerabilities that are introduced during the software development process, but they do not harden the application before deployment and are not designed to protect applications from reverse engineering. There are myriad copy protection technologies that leverage either dongles or universal serial bus (USB) keys to bind a user license to an application, wrap encryption around the software itself, or utilize code obfuscation to protect applications. Dongle-based systems provide an increased level of security by protecting security keys on an external device. However, the cracking community now targets its attacks at this interface and has successfully defeated these systems using device emulators. Other protection technologies encrypt the application software to make reverse engineering difficult, but may require source code modifications or the application to be decrypted completely in memory, leaving it vulnerable to an attack. In addition, many of these approaches do not monitor and detect unauthorized access to software during execution. Code obfuscation helps to prevent reverse engineering but must be introduced during the software development process and requires extensive customization and ongoing engineering support. There is a need in the art, then, to better address piracy, theft and tampering threats without slowing down the software development process and delaying product releases, and to provide a simpler and more comprehensive approach to application security.

SUMMARY OF THE INVENTION

The preferred embodiment(s) of the invention are summarized here to highlight and introduce some aspects of the present invention. Simplifications and omissions may be made in this summary. Such simplifications and omissions are not intended to limit the scope of the invention.

A compiler-like post processor program takes an existing application program as input and scans it for function entry points and calls to entry points. The post processor encrypts functions in the application, scrambles information about the locations of the function code, adds a decryption routine, adds tamper detection and response code, and writes out a partially-encrypted executable file. Protected functions in the protected application program have information written into their headers that the operating system will interpret as illegal instructions so that the functions would not validly execute, even if the modules were decrypted. The new executable launches and behaves just like the original application, but must have the decryption key(s) in order to run successfully. The post processor can set up the protected application to obtain the decryption key(s) directly from the user, from a key server, from a file, or by a variety of other means.

Instead of a post-processor, source code for an application can be written in the first instance with protection features, compiled, and encrypted.

The Execution Controller interacts with the operating system as a debugger and controls the execution of the application. Execution control is transferred to a debugger/decryption routine (hereafter called an Execution Controller) when the operating system detects an illegal address, instruction, or modified opcode in a protected executable file.

The Execution Controller has its own code for managing decryption and tamper protection. The Execution Controller also prevents the user from loading his own instantiation of a debugger to take control of the application. The Execution Controller detects whether there have been any attempts to tamper with the protected executable and responds to tampering. At the discretion of the individual who has handled the protection of the application, a tampered application can either be allowed to continue to run or degrade in a manner which will hinder the tamperer or hacker from obtaining information about the nature of the protection which has been applied.

After a decrypted function has completed execution, control is returned back to the Execution Controller, which either removes the decrypted version of the module from the paging space of the operating system or re-encrypts it.

A benefit of this method is that it denies an attacker access to the entire application in decrypted form. It makes it virtually impossible for them to get information which will enable them to modify the application so that they can eliminate or circumvent the protections and/or features which the copyright holder or owner of the application chooses to apply. It provides detection and countermeasures in the event that attempts are made to tamper with or modify the protected program. Another advantage of the disclosed system and method is an ability to process an existing computer software application without having access to source code or other a priori knowledge of internal program structure.

In alternate embodiments, the invention provides systems and methods to allow debugging of code extensions to protected applications, such as a Dynamic-Link Library (DLL) extension to a Computer-Aided Design (CAD) application, without sacrificing protection of the application. The Secure Debugger of the present invention allows extension developers to examine memory and set breakpoints in their own extensions, without permitting them to view information in the rest of the protected application. The Secure Debugger thus provides a shield between the extension developers and the protected application.

An extension developer must be authenticated before being granted access to the Secure Debugger. In a preferred embodiment, the Secure Debugger opens an authentication window to accept a user name and password from the extension developer, although in alternate embodiments any of a number of authentication mechanisms may be used. Once authenticated, the Secure Debugger displays a console window that allows console debug commands to be issued relative only to the extension being debugged. The Secure Debugger allows interaction with the extension only when control is passed to a function within the extension being debugged. If the extension developer is not properly authenticated, the Secure Debugger console window is not displayed, and the protected application runs normally.

If configured to run, the Secure Debugger executes as part of the Execution Controller, in its own thread. The Secure Debugger may be configured to run via a configuration file that is used by the post-processor program. Alternatively, the Secure Debugger may not be selectively configured, and always be configured to run or not to run.

These and other objects will become apparent from the figures and written description contained herein.

BRIEF DESCRIPTION OF THE DRAWINGS

Other objects, features and advantages will occur to those skilled in the art from the following description of the preferred embodiments of the invention, and the accompanying drawings, in which like numbers are used for like parts, and wherein.

DETAILED DESCRIPTION OF EMBODIMENTS OF THE INVENTION

An Operating System (OS) is a set of computer programs and routines that guides a computer or network in the performance of its tasks. Versions of Microsoft Windows™, such as Windows 2000™, Windows NT™, and Windows XP™, are examples of operating systems. Other operating systems are known.

An Application Program (AP) is a program written to perform a specific task, solve a specific problem, produce a specific report, or update a specific file. Microsoft Word™, Microsoft Excel™, and Microsoft PowerPoint™ are examples of application programs. Other applications are known.

Operating systems and application programs each may assume control over computer resources at various times. An OS typically assumes control over computer resources when the computer first boots. An OS may cede control of some or all computer resources to an AP, depending on the design of the AP. In a multi-tasking OS, the OS and multiple APs may seize and release computer resources at various times depending on the OS design, the AP design, and external events. Operating systems normally regain control over computer resources after APs terminate.

Most present-day operating systems provide a capability to respond to irregular execution of an AP. An AP may cause an irregular event, sometimes called an exception. Exceptions may occur because of hardware faults, e.g., causing an illegal arithmetic operation, such as division by zero. Exceptions may also occur because of unavailability of computer resources, or other reasons. The OS may halt an AP, assume control of computer resources, or take other action in the event of an exception.

Most present-day operating systems also provide capabilities for assisting in debugging applications. Microsoft operating systems, for example, have an application program interface with a number of functions related to debugging. An AP can be programmed with a command for a breakpoint. When the AP executes a breakpoint command, the OS halts execution of the AP. The OS may then transfer control to a debugger application. (The OS may also pass control to a debugger application in response to other exception events.) While the AP is halted, the OS may give a debugger application access to memory locations and other computer resources allocated to the AP, including an ability to change instructions in memory. The debugger application can instruct the OS to resume execution of AP. Other functions may be available depending on the particular OS. In some operating systems, only a single debugger program may be associated with an AP at a given time.

Figure 1:
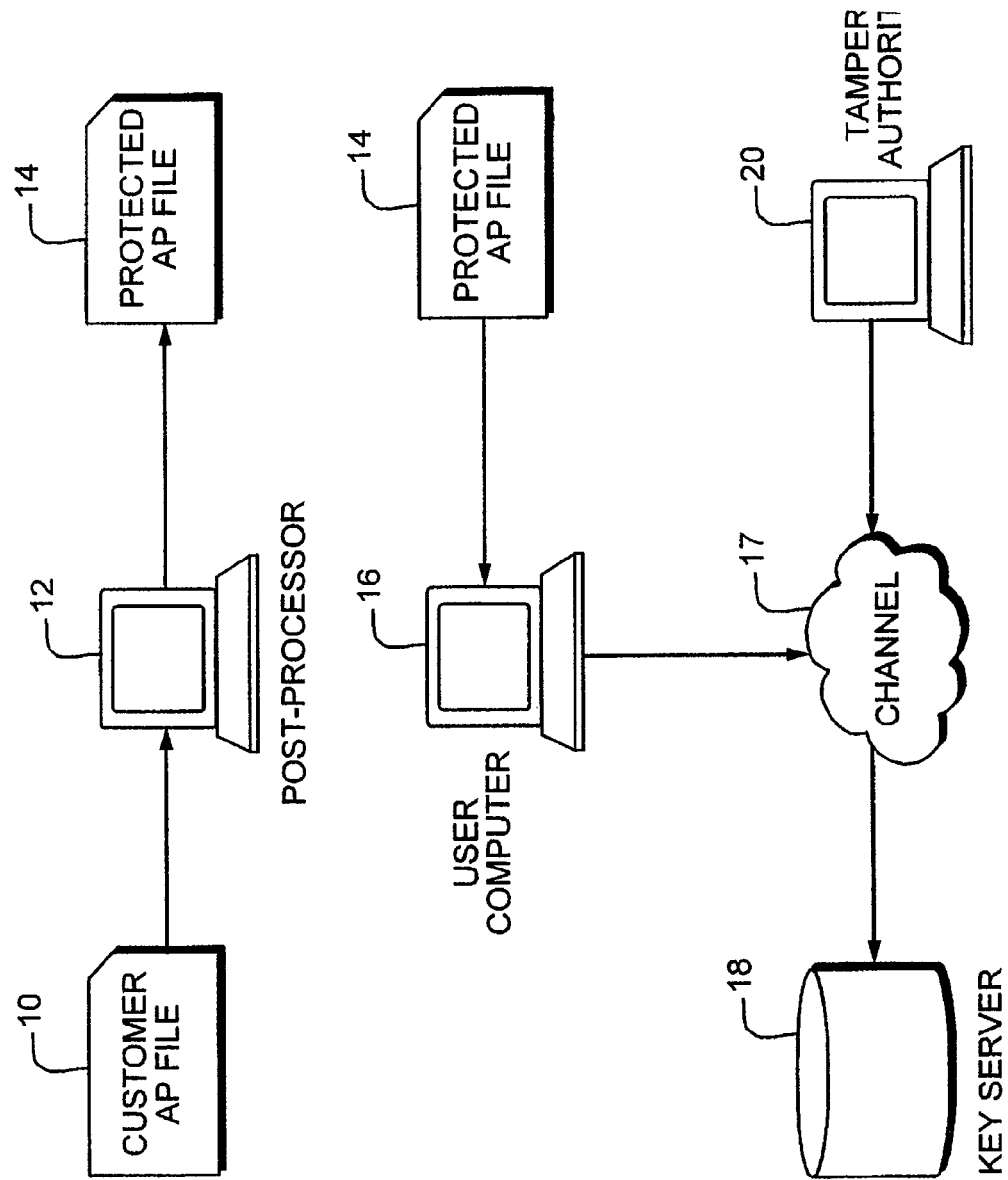
FIG. 1 illustrates a process for modifying an application program for the purpose of regulating its execution.

FIG. 1 illustrates a process for modifying an AP for the purpose of regulating its execution. The goal of such regulation is not to debug the AP, but to limit execution to authorized users. For example, the person or company who creates the AP might charge a fee for its use. Alternately, export of some computer programs outside the U.S. may be restricted. The purpose of regulation is to prevent pirates, hackers, thieves, and other unauthorized users from using the AP, and to detect or respond to tampering.

The first part of the regulation process modifies AP executable instruction sequences. The example provided in FIG. 1 is for an AP that has already been programmed, debugged, and compiled into an executable file. Alternatively, an AP can be written initially to utilize the execution regulation features described below. The executable AP will be referred to as a customer AP file 10.

A post-processor program 12 analyzes the customer AP file 10 to identify functions and other natural partitions within the program. In general terms, the post-processor program 12 modifies the customer AP file 10 to include regulatory features based on innate capabilities of the OS to regulate execution of applications.

Examples of such features are discussed further below. The post-processor program 12 augments the modified AP with additional executable instructions. The modified customer AP file will be referred to as a protected AP file 14.

The second part of the regulation process occurs when executing the protected AP file 14 on a user computer 16. In general terms, executable instructions added to the protected AP file 14 during post-processing interact with instructions of the customer AP file 10 and with the OS of the user computer 16. The protected AP file 14 may include processes that can communicate through an external channel 17 as part of an authentication process, such as to a decryption key server 18. The protected AP file 14 may additionally include processes to respond to any detected tampering of the protected AP file 14 and to report such tampering to an authority 20.

Figure 2:
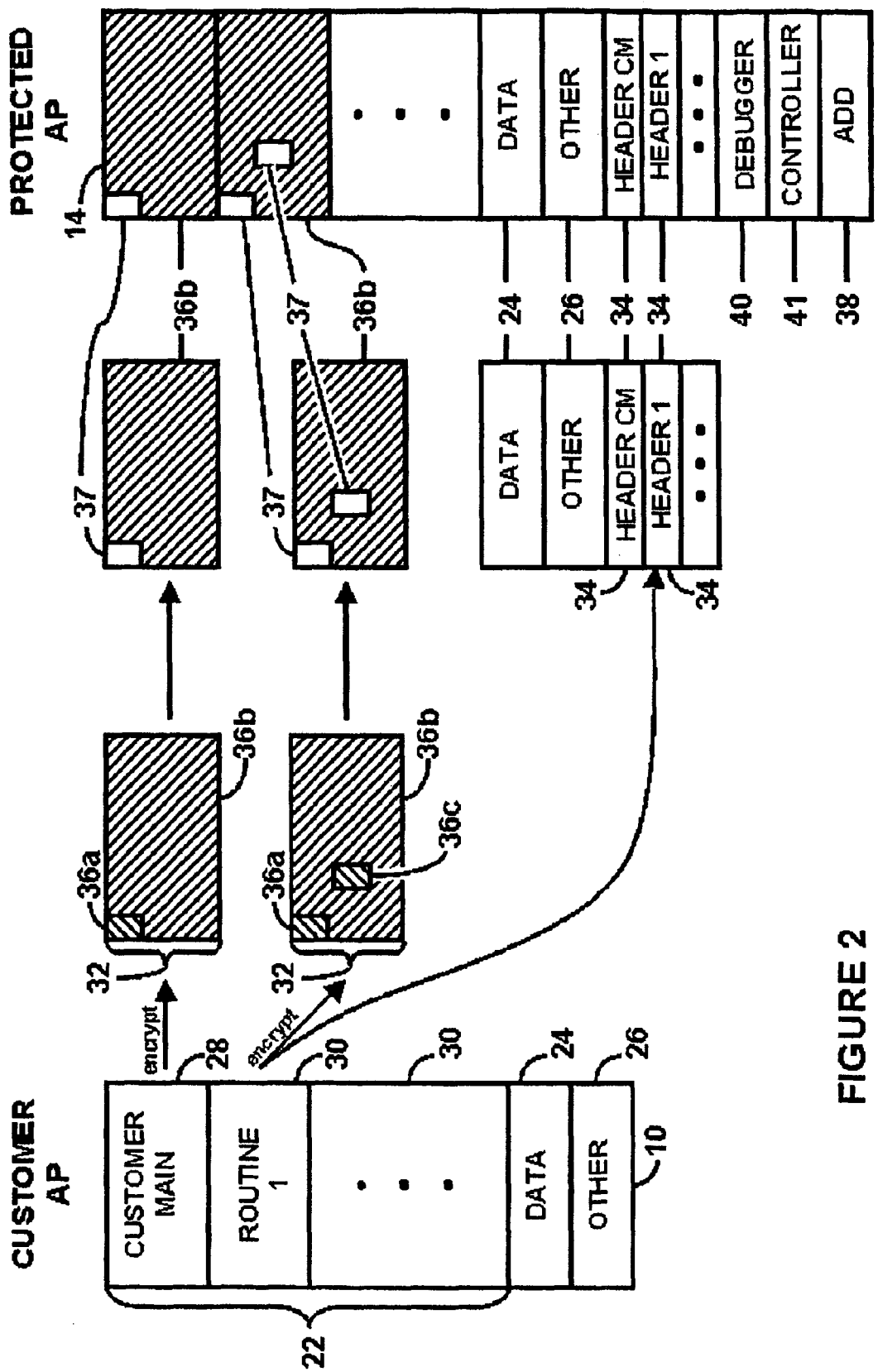
FIG. 2 illustrates structural components of a customer application program file and their conversion into a protected executable file.

FIG. 2 illustrates structural components of a customer AP file 10 and their conversion into a protected AP file 14. Executable files typically have a defined structure depending on the processing environment in which they were intended to operate. In the example of FIG. 2, the customer AP file includes a section of executable code 22, a section of data 24, and another section containing other components 26. The section of executable code 22 typically includes a main routine 28 and a series of additional routines 30. Files could be in other formats, such as libraries.

The post processor program reads the customer AP file 10 and identifies natural boundaries in the executable code. Function boundaries may be jump or call entry points and return instructions. The post processor traces through the executable for jump, call, and other branch or flow control instructions, locates the associated entry points, and examines the subsequent code for return instructions. The post processor stores a record of all function entry points and function lengths, as well as any flow-control instructions that refer to the function. Where a function has multiple entry points, the post processor merges overlapping functions into a single one. If a priori information is available about the customer application (in addition to the executable code itself), the process of identifying natural boundaries can be done other ways. For example, if source code is available, the source code can be examined manually to identify function boundaries or, if debugging information is available, the debugging information can be scanned to identify function boundaries.

After identifying functions, the post processor encrypts some or all of them into cipher-text functions 32. The number of functions to be encrypted may vary according to the nature of the application. The number may be a fixed percentage of functions. Functions having highest call rates may be encrypted (e.g., those called from many different locations within the AP). Functions may also be selected to permit a minimum functionality, such as an ability to launch and read data, but not to write or store data. The selection process need not be automatic. It can involve human intervention and analysis.

Each function is encrypted separately, possibly using a distinct encryption key for each. The encryption and decryption scheme can employ any of a wide variety of encryptions algorithms such as RSA, MD5, RC4, and others. Encryption can be accomplished by software or specialized hardware devices.

For each cipher-text function 32, the post processor preferably substitutes an interrupt instruction 37 for the OS under which the AP was written to run, for the first byte or bytes of the cipher-text 36a as well as for any secondary entry points 36c that may exist in the plain text function.

The post processor also generates a plain-text header 34 for each cipher-text function 32. The plain-text header 34 includes information to identify a decryption key for the function, the length of the function, a checksum for the plain-text (pre-encryption) functions, and a checksum for the cipher-text function. Bytes of the plain-text header are obfuscated using any of a number of known techniques such as byte swapping or encryption. Information to allow descrambling is included in the protected AP file in a way that hinders detection.

The post-processor substitutes the interrupt instruction 37 for an amount of cipher-text function. The resultant function module will thus be a combination of interrupt instruction 37 and a portion 36b of cipher-text subroutine. Preferably, the total length of the combination module will be equal to the length of the original plain-text function. For example, suppose that (a) the plain-text function had a length of 128 bytes, (b) the encryption process generated an equal-length cipher-text function of 128 bytes, and (c) an interrupt instruction is two bytes. The post processor program would replace an amount of cipher-text function equal in length to two bytes.

The post-processor program stores the substituted portion of cipher-text function 36a and 36c to a known location in the executable file such as the end of the code section. The post-processor also stores within the plain text header an offset (relative address) to the displaced cipher text.

The post-processor combines the composite functions (i.e., those interrupt instructions 37 and cipher-text portions 36b) with functions of an additional program called the Execution Controller 40. The post processor may also alter entry-point addresses to reflect moved functions. The functions of the Execution Control 40 will be described more fully below.

Figure 3:
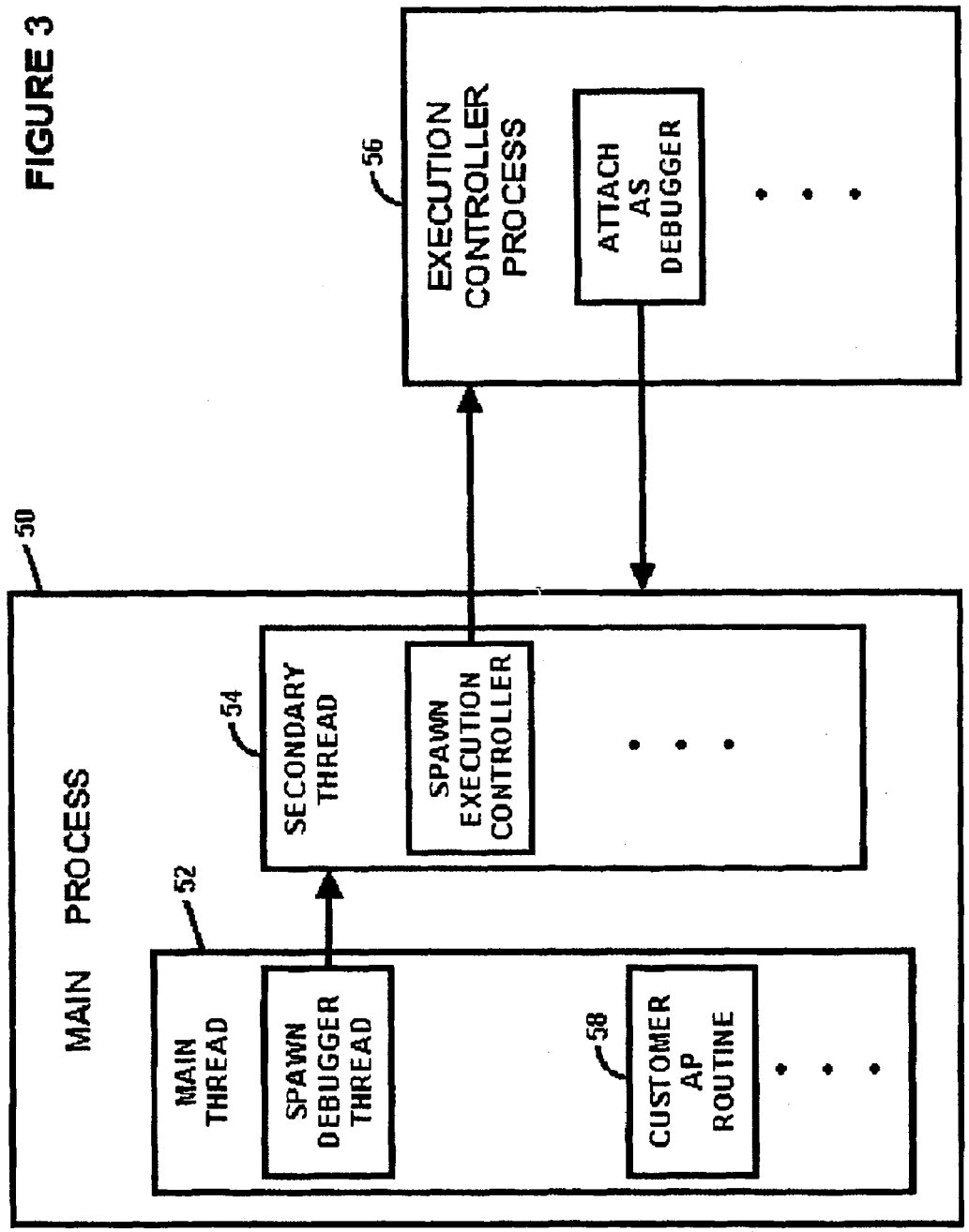
FIG. 3 illustrates a process environment for running the protected application program file on a user computer.

FIG. 3 illustrates a process environment for running the protected AP file on a user computer. The example given is for a Microsoft Windows™ environment. Upon invocation of the AP file, the user computer starts a Main Process 50 for the protected AP. The Main Process 50 has a main thread 52 which immediately spawns a secondary thread 54. The secondary thread 54 in turn spawns a new process 56 for the Execution Controller. The Execution Controller immediately attaches to the Main Process 50 as a debugger. No other debugger can attach to the Main Process 50, because the Execution Controller 56 is now attached. No debugger can attach to the Execution Controller 56, because of the kernel protections it was spawned with.

After the Execution Controller attaches to the Main Process 50, the main thread of the Main Process commences execution of the routines of the customer application 58. Thereafter, the Execution Controller 56 will have a context within the OS of a debugger. The routines of the customer application 58 will have the context of an application being debugged.

Figure 4:
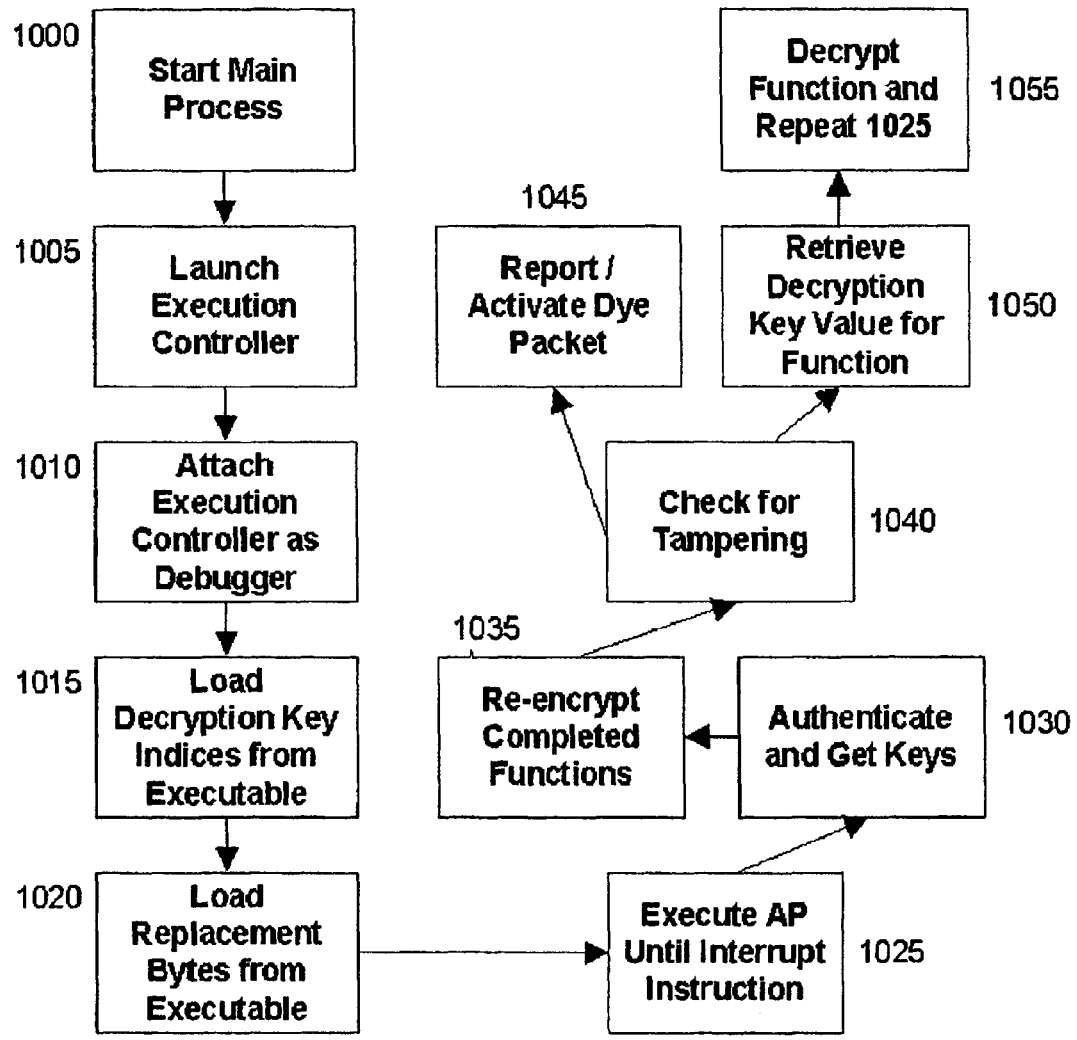
FIG. 4 illustrates steps in executing a protected application program.

FIG. 4 illustrates steps in executing a protected application program. As discussed above, the Main Process starts 1000, which in turn launches the Execution Controller 1005. The Execution Controller attaches to the main process as a debugger 1010. The Execution Controller may then obtain key indices (key identifiers) from headers or elsewhere within the protected AP file 1015. The Execution Controller may then also retrieve the corresponding cipher-text displaced by headers from the protected AP file 1020.

The Main Process executes instructions of the customer AP until it encounters a breakpoint in a protected function 1025. The breakpoint halts execution of the main thread of the Main Process.

The first time the Execution Controller encounters an encrypted function, the Execution Controller initiates a process 1030 to authenticate the user and obtain cryptographic keys. The authentication process may be any of many known authentication processes. One such process is for the Execution Controller first to authenticate the user to the computer, such as by a password, smart card, or other method. The Execution Controller then contacts an external server and verifies whether the user is authorized to use the application.

If the user is authorized, the Execution Controller downloads or otherwise obtains one or more decryption keys for the protected AP file from the key server. The key server may encrypt the keys for transmission using a separate communication key. The communication key may be included in the protected AP file, provided with a smart card to the user, developed interactively during a communication session with the key server, or obtained some other way. The Execution Controller may obtain all decryption keys in one or more communication session. The Execution Controller may obtain keys in other ways, such as from within the protected AP itself, from a smart card provided to the user, or from another source. The Execution Controller stores the decryption keys using any of many known protection techniques. The Execution Controller may also obtain encryption keys for use in re-encrypting functions as discussed below.

Upon encountering breakpoints, the Execution Controller checks any previously-decrypted customer application functions and purges or re-encrypts any that have completed execution 1035. The Execution Controller can determine whether any such functions have finished by comparing the instruction counter of the Main Process main thread to a map of active function entry and return points. The Execution Controller can overwrite completed routines with cipher-text versions. The cipher text can be retrieved from long term storage or retained in more readily-accessible memory by the Execution Controller. If the nature of the function includes changing local variables, the Execution Controller can re-encrypt the module with current variable values. Re-encryption can be accomplished using software on a specialized hardware device After user authentication and function re-encryption (if any), the Execution Controller checks the newly-encountered function for tampering 1040. The Execution Controller verifies checksums, such as checksums for plain-text and cipher-text functions. Other tamper detection schemes may be used.

If the Execution Controller detects tampering, it undertakes any of various responses 1045. One response is to activate a so-called "dye packet." A dye packet is code to assist in proving unauthorized activity, such as by sending a report to an authority. The Execution Controller can communicate a report identifying the user, the application in which tampering was detected, and the nature of the detected tampering (e.g., failed plain-text checksum). The Execution Controller can also terminate the execution of the application, either temporarily or permanently. This termination can be done at a random time after detection so as to limit information available to a hacker about tamper detection methods. The Execution Controller can even delete the protected application from permanent storage.

In the absence of detected tampering, the Execution Controller retrieves the decryption key for the function 1050. The Execution Controller builds a cipher-text buffer from the appropriate replacement bytes and the encrypted bytes of the function not overwritten by the header information. The Execution Controller decrypts the cipher-text function 1055 and writes the plain-text instructions back into the instruction memory for the Main Process main thread.

The Execution Controller resets the instruction counter to resume execution. The Main Process will resume execution normally using the plain-text instructions.

The Main Process main thread resumes execution until it encounters another breakpoint 1025. At that time, the Main Process will again halt and notify the Execution Controller. The Execution Controller repeats steps of re-encrypting completed functions 1035, detecting and responding to tampering 1040, 1045, and decrypting newly encountered functions 1050, 1055. This process repeats throughout execution of the customer AP.

Figure 5:
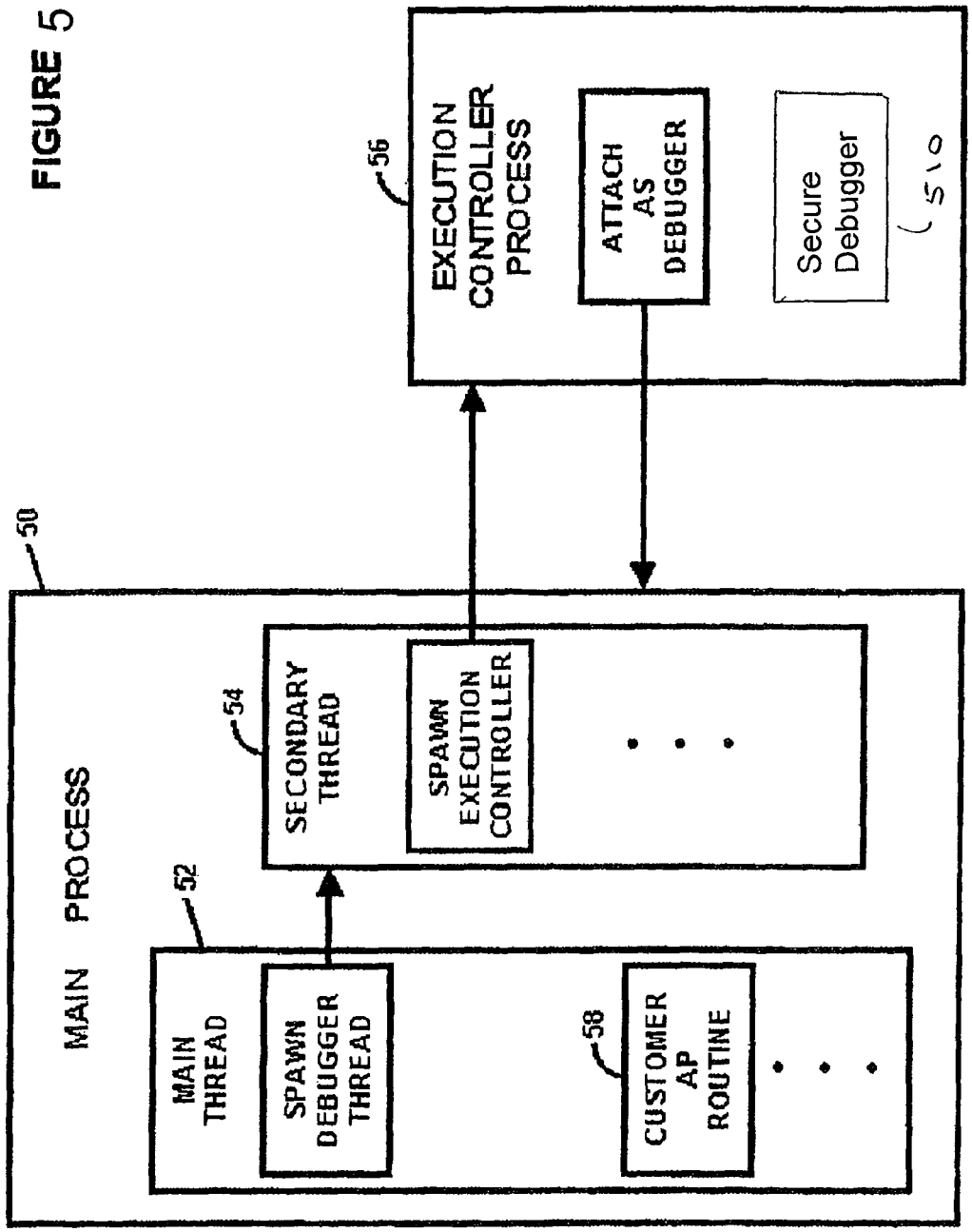
FIG. 5 illustrates an alternate embodiment of the process environment for running the protected application program that includes the Secure Debugger.

FIG. 5 is an alternate embodiment of the process environment shown in FIG. 3 for running the protected application program file. As shown in FIG. 5, Secure Debugger 510 executes as part of the Execution Controller 56. After the Execution Controller 56 attaches to the Main Process 50 as a debugger, the Execution Controller 56 spawns a new thread to run the Secure Debugger 510.

Figure 6:
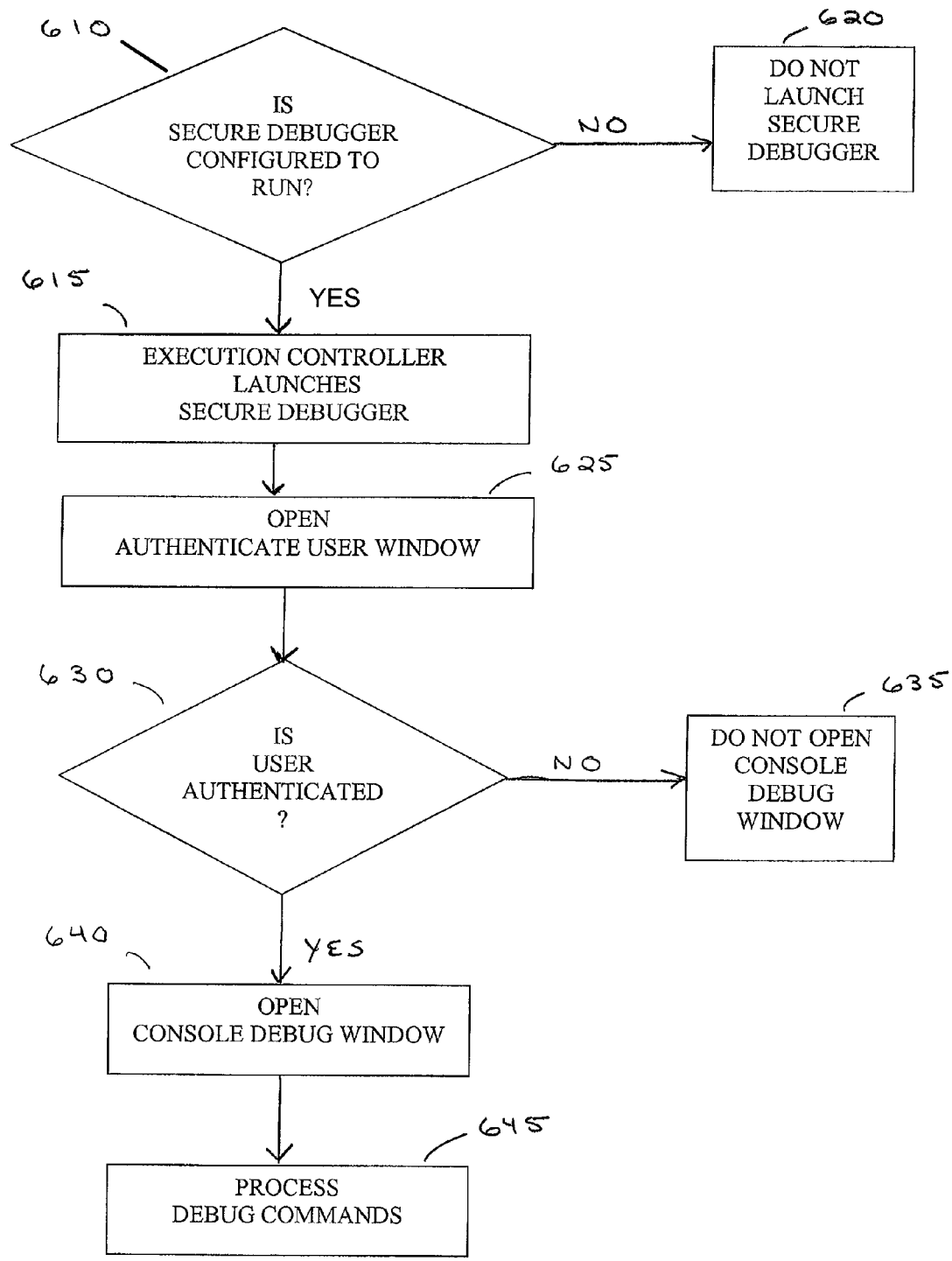
FIG. 6 illustrates steps in launching and running the Secure Debugger.

FIG. 6 illustrates the steps in launching and running the Secure Debugger 510 in a preferred embodiment. As shown in step 610, the Execution Controller first determines if the Secure Debugger 510 is configured to run. In step 615, if the Secure Debugger is configured to run, the Execution Controller 56 launches the Secure Debugger 510. If the Secure Debugger 510 is not configured to run, the Execution Controller 56 does not launch the Secure Debugger, as shown in step 620, and the protected application runs normally.

In a preferred embodiment, the Secure Debugger 510 may be configured to run via a configuration file that is used by the post-processor program. Alternatively, the Secure Debugger 510 may not be selectively configured, and always be configured to run or not to run.

With further reference to FIG. 6, as shown in step 625, the Secure Debugger 510 opens an Authenticate User Window when the protected application is launched. In a preferred embodiment, a user, such as an extension developer, may authenticate using a user name and password, although other known authentication methods, including but not limited to security tokens, biometric keys, and personal identification numbers (PINs) may be used.

If the user is authenticated, as shown in step 630, the Secure Debugger 510 opens a Console Debug Window, as shown in step 640. The Console Debug Window allows authenticated users, such as extension developers, to examine memory and enter breakpoints in their own extensions, without permitting them to view information in the rest of the protected application. As shown in step 645, the Secure Debugger processes debug commands relative to the extension being debugged. Only when control is passed to a function within the extension being debugged will the Secure Debugger allow interaction with the extension. If the user is not authenticated, as shown in step 635, the Console Debug Window is not opened, and the protected application runs normally.

It is noted that the foregoing examples have been provided merely for the purpose of explanation and are in no way to be construed as limiting of the present invention. While the present invention has been described with reference to certain embodiments, it is understood that the words which have been used herein are words of description and illustration, rather than words of limitation. Changes may be made, within the purview of the disclosure, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses.

What is claimed is:

1. A process for executing an application computer program defining a plurality of subsections, said application computer program configured to run under a control of an operating system and incorporating an execution controller computer program, said process steps comprising:
    substituting an operating system instruction that causes an interrupt for one or more bytes of at least one subsection;
    launching the application computer program;
    launching the execution controller computer program, where the execution controller computer program is launched by the application computer program;
    attaching the execution controller computer program to the application computer program using an operating system debugger interface;
    launching a secure debugger computer program, where the secure debugger computer program is launched by the execution controller computer program;
    executing the application computer program until an operating system instruction that causes an interrupt is encountered;
    after an operating system instruction that causes an interrupt is encountered, restoring the operating system instruction that causes an interrupt with the substituted bytes; and
    resuming execution of the application computer program, starting at the restored bytes.

2. The process of claim 1, further comprising the step of:
    after an operating system instruction that causes an interrupt is encountered, terminating the execution of the application computer program.

3. The process of claim 1, further comprising the step of:
    after an operating system instruction that causes an interrupt is encountered, authorizing a continued execution of the application computer program.

4. The process of claim 3, where the step of authorizing a continued execution of the application computer program comprises authenticating a user of the application computer program.

5. The process of claim 1, where at least a portion of the at least one subsection has been encrypted, further comprising the steps of:
    after an operating system instruction that causes an interrupt is encountered, decrypting the encrypted portion; and
    executing the decrypted subsection.

6. The process of claim 5, further comprising the step of:
    re-encrypting the decrypted subsection.

7. The process of claim 5, where at least a portion of the information used to decrypt the encrypted portion is obtained from a key server computer program.

8. The process of claim 5, where at least a portion of the information used to decrypt the encrypted portion is obtained from a location in the application computer program.

9. The process of claim 5, further comprising the steps of:
    after an operating system instruction that causes an interrupt is encountered, detecting if there has been tampering of the application computer program; and
    if tampering has been detected, reporting information related to the tampering to a user of the application computer program.

10. The process of claim 1, further comprising the steps of:
    after an operating system instruction that causes an interrupt is encountered, detecting if there has been tampering of the application computer program; and
    if tampering has not been detected, resuming execution of the application computer program.

11. The process of claim 1, further comprising the steps of:
    after the secure debugger computer program is launched, authenticating a user of the secure debugger computer program.

12. The process of claim 11, further comprising the steps of:
    after the user of the secure debugger computer program is authenticated, accepting debug commands from the user.

13. The process of claim 12, where the debug commands are entered into a window opened by the secure debugger computer program.

14. A process for executing an application computer program that includes a plurality of subsections having boundaries, said application computer program configured to run under a control of an operating system, said process steps comprising:
    substituting an operating system instruction that causes an interrupt for one or more bytes of at least one subsection;
    relocating the substituted bytes to a location in the application computer program this is distinct from the boundaries of the subsection;
    adding an execution controller computer program into the application computer program;
    launching the application computer program;
    launching the execution controller computer program, where the execution controller computer program is launched by the application computer program;
    attaching the execution controller computer program to the application computer program using an operating system debugger interface;
    launching a secure debugger computer program, where the secure debugger computer program is launched by the execution controller computer program;
    executing the application computer program until an operating system instruction that causes an interrupt is encountered;
    after an operating system instruction that causes an interrupt is encountered, restoring the operating system instruction that causes an interrupt with the substituted bytes; and
    resuming execution of the application computer program, starting at the restored bytes.

15. The process of claim 14, further comprising the steps of:
    encrypting at least a portion of at least one subsection of the application computer program; and
    after an operating system instruction that causes an interrupt is encountered, decrypting the encrypted portion.

16. The process of claim 14, further comprising the steps of:
    adding tamper detection instructions and data into the application computer program;
    after an operating system instruction that causes an interrupt is encountered, detecting if there has been tampering of the application computer program; and
    if tampering has been detected, terminating the execution of the application computer program.

17. The process of claim 14, further comprising the steps of:
- adding tamper detection instructions into the application computer program;
- after an operating system instruction that causes an interrupt is encountered, detecting if there has been tampering of the application computer program; and
- if tampering has been detected, reporting the tampering to a user of the application computer program.

18. The process of claim 14, further comprising the steps of:
- after an operating system instruction that causes an interrupt is encountered, authenticating a user of the application computer program; and
- if the user of the application computer program is authenticated, resuming the execution of the application computer program.

19. The process of claim 14, further comprising the steps of:
- after an operating system instruction that causes an interrupt is encountered, authenticating a user of the application computer program; and
- if the user of the application computer program is not authenticated, terminating the execution of the application computer program.

20. The process of claim 14, further comprising the steps of:
- after the secure debugger computer program is launched, authenticating a user of the secure debugger computer program.

* * * * *